Dec. 20, 1966 J. R. LACOSTE Re. 26,128

TENNIS RACKETS AND THE LIKE

Original Filed March 20, 1961

INVENTOR
Jean R. Lacoste

Watson, Cole, Grindle & Watson
ATTORNEYS

United States Patent Office

Re. 26,128
Reissued Dec. 20, 1966

26,128
TENNIS RACKETS AND THE LIKE

Jean René Lacoste, Paris, France

Original No. 3,078,098, dated Feb. 19, 1963, Ser. No. 96,949, Mar. 20, 1961. Application for reissue Feb. 14, 1966, Ser. No. 532,515
6 Claims. (Cl. 273—73)

Matter enclosed in heavy brackets [ ] appears in the original patent but forms no part of this reissue specification; matter printed in italics indicates the additions made by reissue.

In rackets for lawn-tennis and similar games, it has already been proposed to attach the strings across the frame of the racket through the medium of a wire coiled around the frame member, with the strings being engaged around the turns of the coiled wire directly, or around an auxiliary wire or gut engaging such turns and extending around the inner periphery of the frame.

While such a means of stringing a racket has an undeniable advantage over conventional methods in that it eliminates the necessity of having to perforate the frame member, it raises a number of problems of its own.

Firstly the strings are necessarily subjected to sharp bends as they are passed around the turns of the wire coil or the auxiliary wire thereby substantially weakening the strings especially as the mounting wire around which they are passed is of small diameter. Moreover, adjacent the sides of the frame the strings are practically doubled over so that the resulting stringing pattern is of an unusual type including a small and uneven mesh size, and it is found that such a pattern is difficult or impossible to provide by means of the conventional stringing machines. Moreover, the turns of the wire coil are apt to slide or shift along the frame under the pull exerted by the strings, and the proper construction of the coil itself requires the exertion of considerable care.

It is an object of this invention to provide improved means for mounting the strings on a tennis racket whereby the above defects and difficulties are overcome and a number of additional advantages are achieved.

According to the invention there is provided in a tennis racket a substantially rigid yet resilient annular member positioned within the racket frame generally parallel to the inner periphery thereof and provided with serrations, castellations or offsets in the general plane of the annular member and directed outwardly i.e. towards the frame member, and means engaging the apices of said serrations for attaching the annular member to the racket frame, while the racket strings are arranged to bridge the bases of the serrations.

The annular mounting member is preferably made from steel, e.g. spring steel wire.

The annular member can readily be produced mechanically in straightened-out condition with the spacings between the serrations being accurately predetermined with regard to the proper positions the strings are to assume in the completed racket.

Any suitable means may be used for attaching the annular member to the racket frame. Such means may desirably include a wire coil wound around the frame member, such winding operation being greatly facilitated by the fact that the serrations of the member serve as a template to define the spacing or pitch of the turns of the coil. Moreover, after the coil has been positioned the turns of it are retained in position by the serrations and are prevented from shifting along the frame.

The improved annular mounting member can be used in connection with a racket frame of any cross sectional configuration, solid or tubular, circular or oval or of other shapes, without it being necessary to groove or perforate the frame for passing the strings while yet permitting the wire coil to be very tightly engaged around the frame.

In cases where the frame is so formed as to present a groove in its inner periphery, as is the case for example with a frame of the type disclosed in my co-pending patent application No. 96,950, filed March 20, 1961, for "Racket for Lawn-Tennis and Similar Games," *now Patent No. 3,086,777*, such groove will provide an additional lateral guiding and retaining means for the annular member.

Since the strings are bridged across the bases of the serrations they are not subjected to sharp bends and are maintained at normal spacings throughout. They can very easily be placed using conventional racket-stringing machines.

A further advantage is the fact that the annular mounting member acts to distribute the tension strain between the strings, and moreover, serves as an additional resilient medium interposed between the strings and the frame thereby imparting excellent performance characteristics to the racket.

An exemplary embodiment of the invention will now be described for purposes of illustration but not of limitation with reference to the accompanying drawings, wherein.

Figure 1:
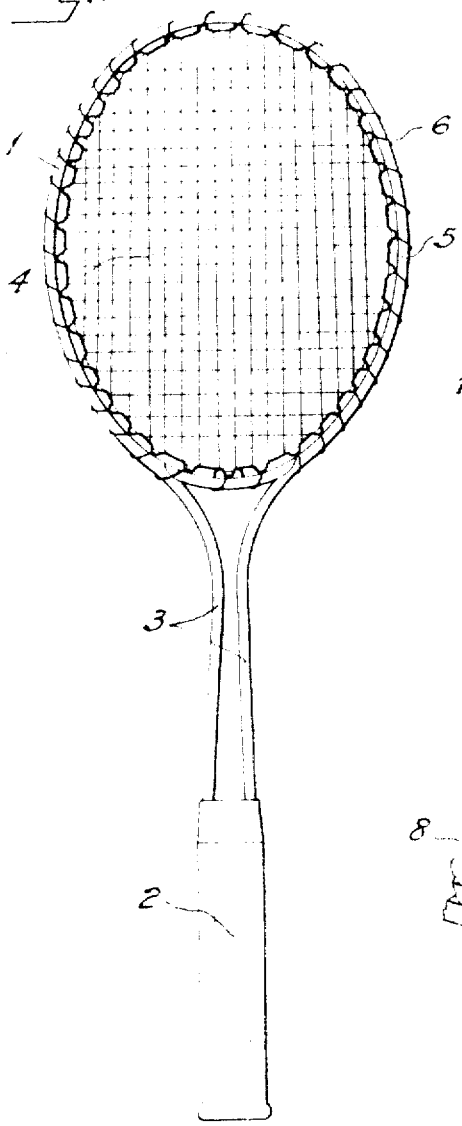
FIG. 1 is a simplified front view of a racket provided with the improved string-mounting means of the invention.

Shown in FIG. 1 is a racket comprising a frame 1, desirably though not necessarily formed from a metallic tubular extruded member having end portions 3 extending from the frame for connection with a handle 2, as explained in my co-pending application above mentioned. Strings 4 are stretched across the frame through the agency of a serrated wire annulus 5 in turn attached to the frame by means of a coiled wire 6.

The serrated annular member 5 is preferably made from stiff, resilient spring steel wire. It is formed with spaced serrations, castellations or offsets 7 of generally triangular shape with rounded corners. The spacing between the serrations is varied along the length of the member in accordance with the requisite spacing of the strings in each part of the frame. Experience has shown that an evenly strung racket can be achieved using only three different values for said spacing.

Figure 2:
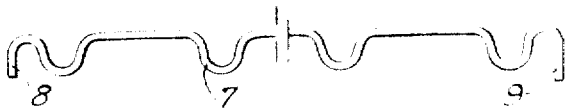
FIG. 2 shows a portion of the annular member in plan, and in flattened condition.

The annular member can be produced by suitable machinery in the flattened or straightened-out condition shown in FIG. 2. The ends 8 and 9 of the member are bent down in the same direction as the serrations (see FIG. 2).

In mounting the member in a racket, it is first press-shaped to the shape of the frame. Where the frame is made from a section member of the type disclosed in my afore-mentioned patent application, as shown in FIGS. 3 and 4 herein, the additional advantage is obtained that the annular member will snap resiliently into position within the inner groove 1a of the frame member.

Figure 3:
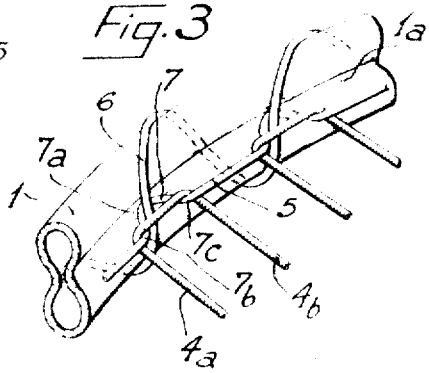
FIG. 3 is a perspective view on an enlarged scale showing a portion of the racket frame and annular member.
Figure 4:
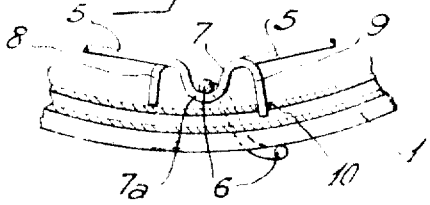
FIG. 4 shows a portion of the frame in section on the midplane of the racket and illustrates the manner in which the extremities of the annular member are anchored.

The turns of the coil 6 serving to attach the member 5 to the frame 1 are passed through the tops 7a of the serrations as shown in FIGS. 3 and 4. Regardless of the shape of frame section used, the coil 6 can be firmly tightened around it and the annular member will accurately determine the location of the turns of wire thereby considerably facilitating the positioning of the coil. The turns are unable to slip or shift around the frame.

Where the frame member has the specific shape here shown and described in my afore-mentioned patent application there is the further advantage that the annular member 5 is positively guided and retained in the groove 1a of the frame member.

Closure of the annular mounting member is quite simply effected by bringing its opposite ends together so that the endmost serrations thereof coincide, with a turn of the wire coil 6 being passed into engagement with the coinciding apices of the two coinciding serrations to block them in position. Desirably, at least one of the out-bent ends of the annular member e.g. end 9 is inserted into a small socket 10 in the frame thereby accurately locating the annular member with respect to the frame. The bent ends 8 and 9 being directed towards the frame member are not liable to injure the user.

The strings 4 are passed from the base portion 7b of a serration on one side thereto to the base portion 7c on the other side of the same serration (see FIG. 3). Thus the strings are at no point bent at a sharp angle and yet the adjacent lengths of the string such as 4a, 4b are retained in their properly spaced, parallel relation. Because the line of contact between the string and the annular member is slanted (or more precisely stated the plane of the string and the plane of the annulus define a small angle to each other at the point of crossover between the string and annulus) there is no sharp bend of the string at the crossover point even though the annulus may be made of relatively thin wire. The stringing operation process is substantially simplified.

The resulting strung mesh is highly uniform with the tensions being evenly distributed between the individual spans of string throughout the frame by the action of the annulus. The latter further acts as an auxiliary spring means interposed between the frame and strings imparting excellent performance characteristics to the tennis racket.

It will be understood that various modifications may be made in the illustrated embodiment without exceeding the scope of the invention, as by modifying the contour of the serrations in the annular member, the means used for retaining such member in the frame, and so on.

In the ensuing claims the term of tennis racket is to be construed in its broad sense as including rackets for games other than lawn-tennis, e.g. squash and badminton.

What I claim is:

1. A tennis racket comprising a frame and a handle, a flat resilient annular member conforming in general contour with that of said frame and positioned within the frame, said member formed with spaced serrations of generally triangular shape projecting outward therefrom toward the frame, retainer means engaging the tops of said serrations for attaching the member to the frame, and racket strings passed in engagement with said member across the bases of said serrations and having relatively parallel spaced portions stretch across the frame, said member being of a material having sufficient rigidity to permanently retain said serrations independently of the action of said retainer means and said strings, the portions of said member between said serrations extending parallel with the said [member] *frame* a distance at least equal to the base of said serrations to space apart adjoining parallel portions of said strings accordingly.

2. A tennis racket comprising an oval frame and a handle; a flat oval [annulus] *annular member* of spring wire positioned within the frame and formed with spaced serrations of generally triangular shape projecting outward toward the frame; a wire retainer engaging the frame and passed through the outermost ends of said serrations for retaining the [annulus] *member* on the frame; and racket strings passed across the bases of said serrations in engagement with said [annulus] *member* and having relatively parallel spaced portions stretched across the frame, said member being of a material having sufficient rigidity to permanently retain said serrations independently of the action of said retainer and said strings, the portions of said member between said serrations extending parallel with the said [member] *frame* a distance at least equal to the base of said serrations to space apart adjoining parallel portions of said strings accordingly.

3. A racket as claimed in claim 1, wherein said annular member comprises spring steel wire.

4. A racket as claimed in claim 1, wherein the annular member is made from a length of straight spring wire formed with serrations and shaped into a closed loop with the endmost serrations at the ends of the length of wire being brought into coincidence.

5. A racket according to claim 4 wherein said retainer is engaged through the tops of the coinciding endmost serrations.

6. A racket as claimed in claim 4, wherein the ends of the length of wire are bent outwards towards the frame and at least one of said outbent ends is anchored in a socket of the frame.

References Cited by the Examiner

The following references, cited by the Examiner, are of record in the patented file of this patent or the original patent.

UNITED STATES PATENTS

| | | | |
|---|---|---|---|
| 1,179,435 | 4/1916 | Hutchinson | 273—73 |

FOREIGN PATENTS

| | | |
|---|---|---|
| 209,780 | 6/1960 | Austria. |
| 14,397 | 1909 | Great Britain. |

DELBERT B. LOWE, *Primary Examiner.*

M. R. PAGE, *Assistant Examiner.*